(12) United States Patent  
Schroeter

(10) Patent No.: US 7,488,377 B2  
(45) Date of Patent: Feb. 10, 2009

(54) DEVICE FOR THE INTAKE AND COMPRESSION OF AT LEAST ONE GAS IN FUEL CELL SYSTEM

(75) Inventor: Dirk Schroeter, Winnenden (DE)

(73) Assignee: Daimler AG, Stuttgart (DE)

(*) Notice: Subject to any disclaimer, the term of this patent is extended or adjusted under 35 U.S.C. 154(b) by 482 days.

(21) Appl. No.: 10/518,361

(22) PCT Filed: Apr. 30, 2003

(86) PCT No.: PCT/EP03/04481

§ 371 (c)(1),
(2), (4) Date: Jul. 26, 2005

(87) PCT Pub. No.: WO04/001891

PCT Pub. Date: Dec. 31, 2003

(65) Prior Publication Data

US 2005/0268978 A1 Dec. 8, 2005

(30) Foreign Application Priority Data

Jun. 21, 2002 (DE) ................. 102 27 771

(51) Int. Cl.
B01D 46/10 (2006.01)
(52) U.S. Cl. ................ 96/380; 96/383; 96/384; 96/386; 55/385.1; 55/385.3; 55/DIG. 17; 181/229; 181/403; 417/312; 417/902; 429/12; 429/34

(58) Field of Classification Search ............... 55/385.1, 55/385.3, DIG. 17; 96/380, 383, 384, 386; 181/229, 403; 417/312, 902; 429/12, 34
See application file for complete search history.

(56) References Cited

U.S. PATENT DOCUMENTS

| | | | |
|---|---|---|---|
| 3,507,702 A | | 4/1970 | Sanderson |
| 3,863,733 A | * | 2/1975 | Raudman et al. ............ 181/252 |
| 5,944,878 A | | 8/1999 | Lindhe |
| 6,382,161 B1 | * | 5/2002 | Alex et al. ............. 123/184.53 |
| 6,503,303 B2 | * | 1/2003 | Fuesser ....................... 96/380 |
| 6,626,984 B1 | * | 9/2003 | Taylor ......................... 96/380 |
| 6,881,237 B2 | * | 4/2005 | Storz et al. ................ 55/385.3 |
| 6,893,487 B2 | * | 5/2005 | Alger et al. .................... 95/273 |
| 2001/0049036 A1 | | 12/2001 | Raiser |

(Continued)

FOREIGN PATENT DOCUMENTS

CH 492311 7/1970

(Continued)

OTHER PUBLICATIONS

German office action dated Mar. 13, 2007 with English translation.

(Continued)

Primary Examiner—Duane S Smith  
Assistant Examiner—Minh-Chau T. Pham  
(74) Attorney, Agent, or Firm—Crowell & Moring LLP

(57) ABSTRACT

A device for sucking in and compressing at least one gas in a fuel cell system has a compressor for the gas connected, at its gas inlet, to a gas filter system via an elastic, sealed gas-routing passage made from textile material.

20 Claims, 1 Drawing Sheet

U.S. PATENT DOCUMENTS

2004/0118282 A1* 6/2004 Alger et al. .................... 95/273
2004/0157095 A1 8/2004 Bruck et al.

FOREIGN PATENT DOCUMENTS

| | | |
|---|---|---|
| DE | 3505401 A1 | 8/1986 |
| DE | G 9400428.5 | 5/1994 |
| DE | 4412450 A1 | 10/1995 |
| DE | 19635799 A1 | 3/1998 |
| DE | 10027350 A1 | 12/2001 |
| DE | 69613690 T2 | 5/2002 |
| DE | 10065306 A1 | 7/2002 |
| DE | 10218673 A1 | 11/2003 |
| JP | 7-158527 A | 6/1995 |
| JP | 2002-50376 A | 2/2002 |

OTHER PUBLICATIONS

English tanslation of Japanese office action dated Aug. 6, 2008.

* cited by examiner

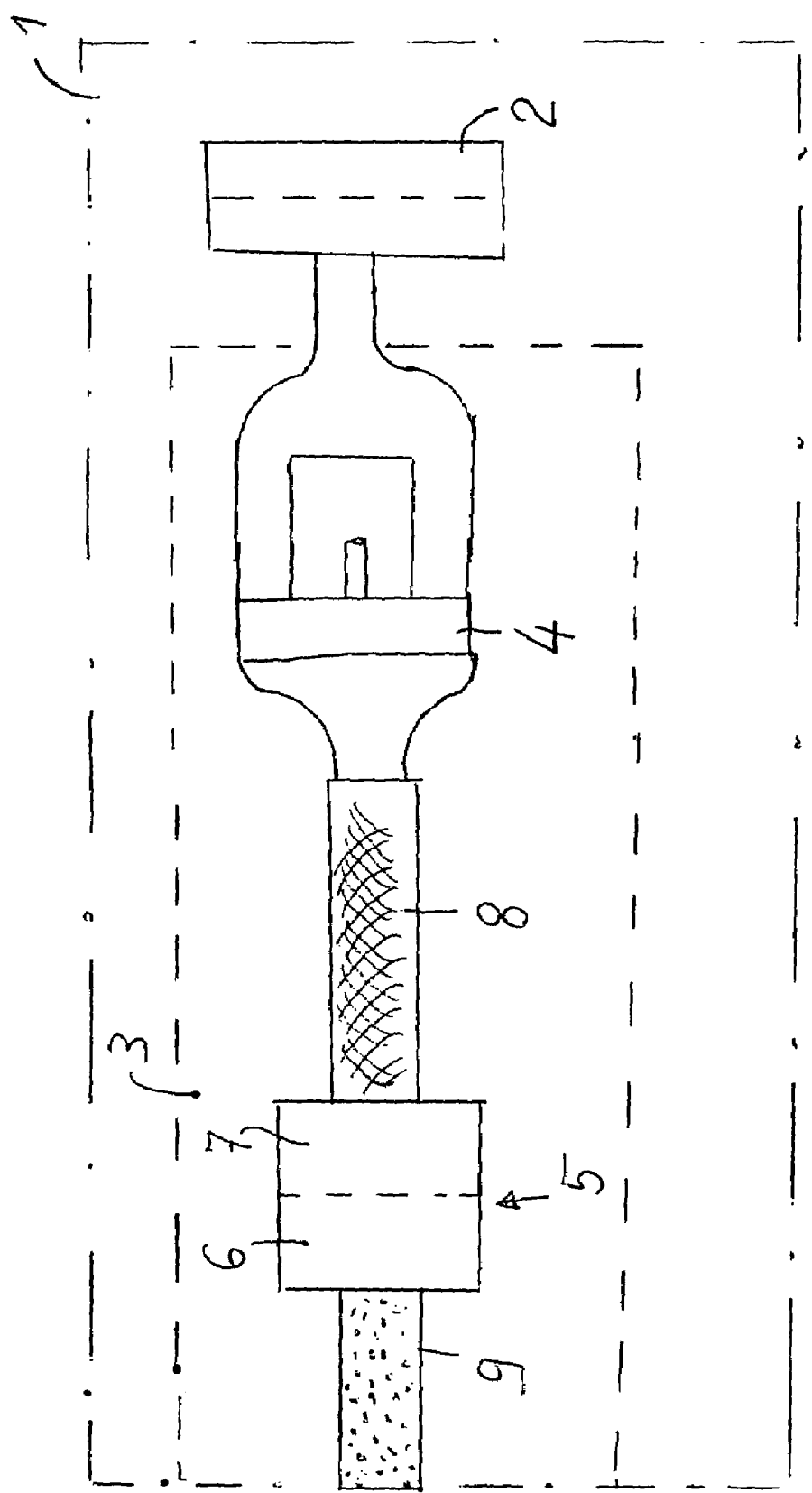

DEVICE FOR THE INTAKE AND COMPRESSION OF AT LEAST ONE GAS IN FUEL CELL SYSTEM

BACKGROUND AND SUMMARY OF THE INVENTION

This invention relates to a device for sucking in and compressing at least one gas in a fuel cell system which has a fuel cell to which gaseous fuel and an oxidizing gas are supplied.

A drive unit in a vehicle which has an electric driving motor, a fuel cell, a fuel tank, a water store, an evaporator and a reformer is known. The fuel tank contains methanol which, with water from the water store, is converted into the gaseous state in the evaporator and is then passed to the reformer, in which substantially hydrogen, carbon dioxide and carbon monoxide are formed when heat is supplied by means of a catalytic burner. The carbon monoxide can be oxidized using an oxidizing agent. The hydrogen-containing fuel gas from the reformer is fed by means of a compressor to the fuel cell, which comprises a fuel cell stack in which a large number of individual fuel cell modules are integrated. Air is fed to the fuel cell by means of a further compressor. In the fuel cell, electrical energy for the electric driving motor is generated from the hydrogen and the oxygen of the air (See German document DE 44 12 450 A1).

To operate, a fuel cell requires sufficiently purified gas and/or a gas mixture with respect to the fuel gas and the oxidizing gas, which is in many cases air. This means that impurities in the gases have to be eliminated. Examples of impurities of this type, which damage the fuel cell system, may include particles, aerosols or polluting gases. Filters connected upstream of the compressors are used for the gas purification.

For compression it is possible to use centrifugal compressors, which in operation generate high-frequency noise, which is unpleasant. To reduce environmental pollution, this noise has to be muffled. It is known to arrange deep-tuned Helmholtz resonators in exhaust mufflers of motor vehicles. Since Helmholtz resonators for muffling noise generally comprise a plurality of cylindrical chambers connected to one another by tubes, they increase the overall volume of a gas-routing section. In particular in mobile devices, it is desirable to minimize the space taken up by gas-routing systems.

There is a known sound-muffling tube for carrying gases in which sound reflectors which reduce the passage cross section are arranged at intervals in the axial direction of the tube. The reflectors are formed by a corrugated tube wall, which in addition to the corrugation also includes elements which disrupt the propagation of sound (See German document DE 35 05 401 A1).

In another known device for reducing resonance effects in pipelines through which gases flow, the gas flow is distributed between in each case two identical, substantially parallel tubes, at least one of which is provided with a perforation over which a covering hood is fitted (See German document DE 94 00 428 U1).

Finally, a porous muffling hose for muffling intake noise in internal combustion engines is known (See German document DE 196 35 799 A1). The muffling hose is formed from a roll of a flat mesh material of weldable plastic filaments which consist of a single material. Since the muffling hose is longitudinally elastic, it does not transmit any longitudinal vibrations in the intake section of the corresponding internal combustion engine.

This invention addresses the problem of providing a device for sucking in and compressing at least one gas in a fuel cell system in which the structure-borne sound originating from the respective compressor is muffled in a simple and space-saving way.

The problem is solved according to the invention, in a device for sucking in and compressing at least one gas in a fuel cell system which has a fuel cell to which gaseous fuel and an oxidizing gas are supplied, by virtue of the fact that a compressor for the gas is connected at its entry or gas inlet to a gas filter system via an elastic, sealed gas-routing passage made from textile material. In the device according to the invention, the sound waves emanating from the compressor when the latter is operating are muffled both by the elastic gas-routing passage or hose and by the gas filter system. The latter prevents sound waves which still arrive, for example, at the filter-side end of the gas-routing passage from being able to pass to the outside without being impeded.

In particular, the gas-routing passage includes fibers which are sealed off so as to prevent the penetration of gases from the space outside the gas-routing passage by means of an elastic coating. The coating may consist of a plastic, e.g. an elastomer, or of a metal.

In a preferred refinement, a gas-routing passage formed from porous, textile material is provided upstream of the gas filter system and connected to the gas inlet of the gas filter system. In this device, which constitutes an independent inventive configuration, the gas which is sucked in is pre-filtered. Furthermore, the sound waves, which have already been greatly muffled by the elastic gas-routing passage between compressor and gas filter system and by the latter, are muffled still further, so as to achieve a particularly good reduction in noise. Moreover, the porous gas-routing passage upstream of the gas filter retains particles in the gas which is sucked in, so that they cannot enter the filter system.

It is expedient for the textile material of the porous gas filter passage to be coated with at least one active substance which is ready to react with respect to at least one gas. It is in this way possible to reduce the concentration of at least one polluting gas which is contained in the gas that is sucked in and is undesirable for operation of the fuel cell even upstream of the filter system.

In the text which follows, the invention is described in more detail on the basis of an exemplary embodiment illustrated in a drawing, from which further details, features and advantages will emerge.

BRIEF DESCRIPTION OF THE DRAWING

The drawing diagrammatically depicts a device for sucking in and compressing at least one gas in a fuel cell system.

DETAILED DESCRIPTION OF THE INVENTION

A fuel cell system 1, which in a manner known per se includes a fuel cell 2, for example of the PEM type, and further components which are not shown in the drawing, such as a fuel tank, a water store, an evaporator and a reformer, also has at least one device 3 for sucking in and compressing a gas. This gas may, for example, be air, the oxygen in which is the oxidizing gas which reacts with the gaseous fuel in the fuel cell 2 to generate electrical energy. Gaseous fuel contains, for example, hydrogen.

The device 3 includes a compressor 4 which sucks in and compresses the air. The compressed air passes, via passages which are not shown in more detail, to the fuel cell 2. The compressor 4 used is, for example, a centrifugal compressor which is driven by an electric motor (not shown).

Fuel cell systems are also used in mobile equipment, such as motor vehicles, on account of their relatively high efficiency and low emission of pollutants. Small component dimensions and low weights are important factors in such equipment. On account of the small dimensions with a large delivery line, the compressor 4 is designed for high rotational speeds. At high rotational speeds, the compressor 4 generates disruptive noise composed of a plurality of frequency components.

The device 3 also includes a filter system 5 which is used to purify the gas sucked in by the compressor 4. The filter system 5 may comprise more than one section, for example two sections 6, 7. In section 6, for example, the gas which has been sucked in has particles, such as dust and particulates, removed from it, i.e. mechanical substances are cleaned out. In section 7, which is connected downstream of section 6, by way of example, pollutant gases which have an adverse effect on operation of the fuel cell are removed.

The high-frequency noise emanating from the compressor 4 is to be muffled using space-saving means in as simple a way as possible. For this purpose, the filter system 5 is connected to the gas inlet of the compressor 4 by an elastic, sealed gas-routing passage 8 made from textile material. The gas-routing passage 8 is in particular a hose formed from textile fibers or filaments, e.g. in the form of a woven fabric, and has a coating which prevents the penetration of gases from the space outside the gas-routing passage 8. It is therefore impossible for any further impurities to enter the gas which has been sucked in by the compressor 4 downstream of the filter system 5. The textile materials of the gas-routing passage 8 may be coated with plastics or elastomers or metals. The coating may be applied to the inside and/or outside of the gas-routing passage. By virtue of its structure, the gas-routing passage 8 absorbs sound energy. Therefore, only some of the sound energy originating from the compressor reaches the gas filter system 5. The gas filter 5 further muffles sound energy.

On that side of the gas filter system 5 which is remote from the compressor 4, i.e. on its gas inlet side, the gas filter system 5 is connected to a porous, flexible gas-routing passage 9 which is composed of textile material. The gas-routing passage 9, which, in particular as a porous hose, consists of plastic or natural fibers or filaments which can be worked into a fabric additionally muffles any sound energy which may still emerge from the filter system 5. The intake and compression device 3 illustrated in the drawing therefore has particularly good sound-muffling properties.

Furthermore, the gas-routing passage 9 effects pre-filtering of the gas which has been sucked in, i.e. particles, such as dust, are retained even at this stage, which means that they can no longer enter the filter system 5. The porosity of the gas-routing passage 9 can be adapted to the size of particles which may be present in the gas which is sucked in.

Furthermore, it is advantageous if the surface of the gas-routing passage 9 is provided with an active substance which reacts with certain gases which are undesirable for operation of the fuel cell 2 and, for example, adsorbs them. It is in this way possible to reduce the concentration of gases of this type even upstream of the filter system 5. The pre-filtering of the gas which is sucked in makes it possible to reduce the outlay on the gas filter system 5, i.e. less space is needed for the gas filter system 5.

The invention claimed is:

1. A device for sucking in and compressing at least one gas in a fuel cell system which has a fuel cell to which gaseous fuel and an oxidizing gas are supplied, comprising:
   a compressor for the gas,
   a gas filter system to which the compressor is connected,
   an elastic, sealed gas-routing passage made from textile material that interconnects the gas filter system to a gas inlet of the compressor and that prevents penetration of gases from outside the sealed gas routing passage, and
   a porous, flexible gas routing passage connected to an inlet side of the gas filter system to pre-filter gas entering the gas filter system and prevent particles in the gas from entering the gas filter system.

2. The device as claimed in claim 1, wherein the sealed gas-routing passage has textile fibers or filaments which are provided with an elastic, gastight coating.

3. The device as claimed in claim 2, wherein the coating is a plastic or a metal.

4. The device as claimed in claim 1, wherein the sealed gas-routing passage is a hose.

5. The device as claimed in claim 1, wherein the porous gas-routing passage is made from porous textile material.

6. The device as claimed in claim 5, wherein the porous gas-routing passage includes textile fibers or filaments.

7. The device as claimed in claim 5, wherein a surface of the porous gas-routing passage is coated with at least one active substance which is ready to react with respect to at least one gas.

8. The device as claimed in claim 5, wherein the porous gas-routing passage is a hose.

9. The device as claimed in claim 1, wherein the device is arranged in a mobile device.

10. The device as claimed in claim 2, wherein the sealed gas-routing passage is a hose.

11. The device as claimed in claim 3, wherein the sealed gas-routing passage is a hose.

12. The device as claimed in claim 2, and further wherein the porous gas-routing passage is made from porous textile material.

13. The device as claimed in claim 12, wherein the porous gas-routing passage includes textile fibers or filaments.

14. The device as claimed in claim 12, wherein a surface of the porous gas-routing passage is coated with at least one active substance which is ready to react with respect to at least one gas.

15. The device as claimed in claim 12, wherein the porous gas-routing passage is designed as a hose.

16. The device as claimed in claim 4, wherein the porous gas-routing passage is made from porous textile material.

17. The device as claimed in claim 16, wherein the porous gas-routing passage includes textile fibers or filaments.

18. The device as claimed in claim 16, wherein a surface of the porous gas-routing passage is coated with at least one active substance which is ready to react with respect to at least one gas.

19. The device as claimed in claim 16, wherein the porous gas-routing passage is a hose.

20. The device as claimed in claim 3, and further wherein the porous gas-routing passage is made from porous textile material.

* * * * *